(12) United States Patent
Kennedy et al.

(10) Patent No.: US 9,864,088 B2
(45) Date of Patent: *Jan. 9, 2018

(54) METHODS AND APPARATUS FOR ADAPTIVE SOURCE ELECTROMAGNETIC SURVEYING

(71) Applicant: PGS Geophysical AS, Oslo (NO)

(72) Inventors: Dougal Kennedy, Peebles (GB); Gustav Goran Mattias Sudow, Solna (SE); Robert Juhasz, Stockholm (SE)

(73) Assignee: PGS Geophysical AS, Oslo (NO)

( * ) Notice: Subject to any disclaimer, the term of this patent is extended or adjusted under 35 U.S.C. 154(b) by 120 days.

This patent is subject to a terminal disclaimer.

(21) Appl. No.: 14/271,162

(22) Filed: May 6, 2014

(65) Prior Publication Data
US 2014/0239958 A1 Aug. 28, 2014

Related U.S. Application Data

(63) Continuation of application No. 13/408,831, filed on Feb. 29, 2012, now Pat. No. 8,797,036.

(51) Int. Cl.
G01V 3/12 (2006.01)
G01V 3/08 (2006.01)
G01V 1/38 (2006.01)

(52) U.S. Cl.
CPC ............. *G01V 3/12* (2013.01); *G01V 3/083* (2013.01); *G01V 1/38* (2013.01)

(58) Field of Classification Search
CPC . G01V 3/00; G01V 3/08; G01V 3/081; G01V 3/083; G01V 3/12; G01V 3/15; G01V 3/165; G01V 3/17; G01V 1/38; G01V 1/3808

USPC ............................ 324/32, 323–375
See application file for complete search history.

(56) References Cited

U.S. PATENT DOCUMENTS

| | | | | |
|---|---|---|---|---|
| 2,531,088 A | * | 11/1950 | Thompson | G01V 3/02 324/365 |
| 2,838,731 A | | 6/1958 | Cruzan et al. | |
| 3,182,250 A | | 5/1965 | Mayes | |
| 4,070,612 A | * | 1/1978 | McNeill | G01V 3/107 324/334 |

(Continued)

OTHER PUBLICATIONS

Chris Anderson et al. "An integrated approach to marine electromagnetic surveying using a towed streamer and source", May 2010, pp. 71-75, EAGE first break, vol. 28.

(Continued)

*Primary Examiner* — Tung X Nguyen
*Assistant Examiner* — Lee Rodak

(57) ABSTRACT

Disclosed are methods and apparatus for adaptive source electromagnetic (EM) surveying. In accordance with one embodiment, a source waveform signal is generated, and an outgoing EM signal which is based on the source waveform signal is transmitted using an antenna. A responsive electromagnetic signal is detected using at least one electromagnetic sensor, and a receiver waveform signal based on the responsive electromagnetic signal is obtained. A feedback control signal which depends on at least one input signal is determined. Based on the feedback control signal, the source waveform signal is adapted. Other embodiments, aspects, and features are also disclosed.

13 Claims, 6 Drawing Sheets

(56) References Cited

U.S. PATENT DOCUMENTS

| | | | | |
|---|---|---|---|---|
| 4,298,840 | A * | 11/1981 | Bischoff | G01V 3/15 324/357 |
| 4,617,518 | A * | 10/1986 | Srnka | G01V 3/06 324/364 |
| 4,677,438 | A | 6/1987 | Michiguchi et al. | |
| 5,703,833 | A | 12/1997 | Allen | |
| 6,236,211 | B1 * | 5/2001 | Wynn | G01V 3/02 324/357 |
| 6,628,119 | B1 * | 9/2003 | Eidesmo | G01V 3/12 324/337 |
| 6,914,433 | B2 | 7/2005 | Wright et al. | |
| 7,042,801 | B1 * | 5/2006 | Berg | G01V 1/00 324/323 |
| 7,132,831 | B2 * | 11/2006 | Brabers | G01V 3/02 324/357 |
| 7,671,598 | B2 | 3/2010 | Ronaess et al. | |
| 8,072,222 | B2 * | 12/2011 | Combee | G01V 3/083 324/337 |
| 8,386,182 | B2 | 2/2013 | Hornbostel | |
| 2006/0238200 | A1 * | 10/2006 | Johnstad | G01V 1/201 324/337 |
| 2009/0072831 | A1 * | 3/2009 | Summerfield | G01V 3/12 324/323 |
| 2009/0243613 | A1 * | 10/2009 | Lu | G01V 3/12 324/323 |
| 2009/0262601 | A1 | 10/2009 | Hillesund et al. | |
| 2010/0233955 | A1 * | 9/2010 | Hornbostel | G01V 3/083 455/40 |
| 2011/0068796 | A1 * | 3/2011 | Signorelli | G01V 3/30 324/338 |
| 2011/0164470 | A1 | 7/2011 | Wei et al. | |

OTHER PUBLICATIONS

Johan Mattsson et al. "Error analysis and capability modelling for towed streamer electromagnetics", Aug. 2012, pages 91-96, EAGE first break, vol. 30.

Johan Mattsson et al. "Towed streamer EM: the challenges of sensitivity and anisotropy", Jun. 2013, pp. 155-159, EAGE first break, vol. 31.

\* cited by examiner

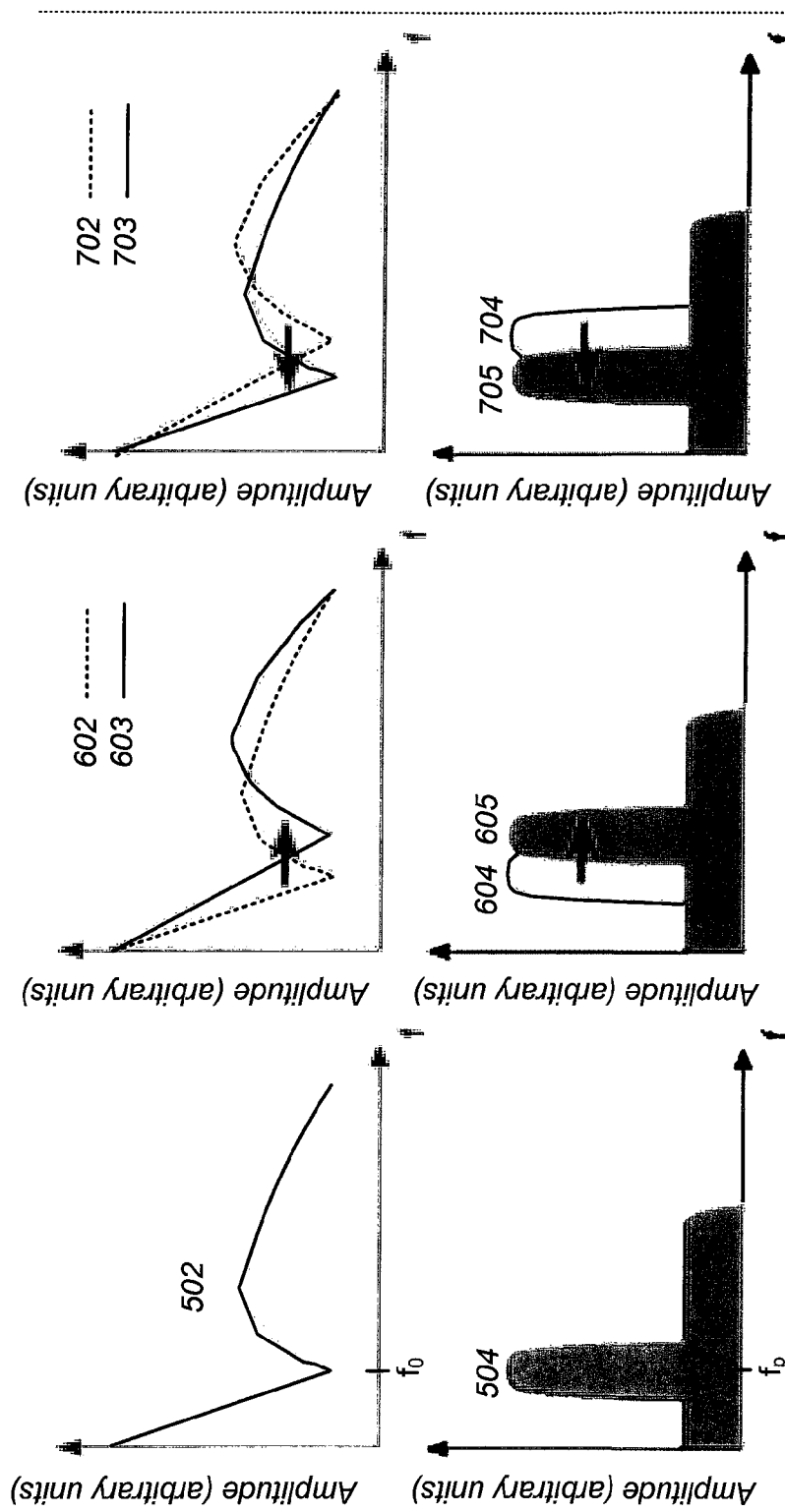

METHODS AND APPARATUS FOR ADAPTIVE SOURCE ELECTROMAGNETIC SURVEYING

CROSS-REFERENCE TO RELATED APPLICATION(S)

The present application is a continuation of U.S. patent application Ser. No. 13/408,831, filed Feb. 29, 2012, the disclosure of which is hereby incorporated by reference in its entirety.

BACKGROUND

Electromagnetic (EM) geophysical surveying involves imparting an electric field or a magnetic field into subsurface Earth formations, such formations being below a body of water such as a sea, river, lake, or ocean in marine surveys, and measuring electric field amplitude and/or amplitude of magnetic fields by measuring voltage differences induced in electrodes, antennas and/or interrogating magnetometers disposed at the Earth's surface, or on or above the floor of the body of water. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Electromagnetic surveying may also involve imparting a time-varying electromagnetic field into the subsurface formations by passing time-varying electric current through a transmitter antenna. The alternating current may have one or more selected discrete frequencies. Such surveying is known as frequency-domain controlled-source electromagnetic (f-CSEM) surveying. Another technique is known as transient controlled-source electromagnetic surveying (t-CSEM). In t-CSEM, electric current is passed through a transmitter at the Earth's surface (or near the floor of a body of water), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching techniques are possible.

The above methods for f-CSEM and t-CSEM have been adapted for use in marine environments. Cable-based sensors have been devised for detecting electric and/or magnetic field signals resulting from imparting electric and/or magnetic fields into formations below the bottom of a body of water. Systems with towed electromagnetic receivers have also been devised.

BRIEF DESCRIPTION OF THE DRAWINGS

FIGS. 5A and 5B depict frequency-domain graphs of an example Earth's frequency response spectra and a corresponding source waveform signal, respectively, in accordance with an embodiment of the invention.

FIGS. 6A and 6B depict, respectively, a positive frequency shift in the Earth's frequency response and a corresponding positive shift in an adaptive source signal in accordance with an embodiment of the invention.

FIGS. 7A and 7B depict, respectively, a negative frequency shift in the Earth's frequency response and a corresponding negative shift in an adaptive source signal in accordance with an embodiment of the invention.

Note that the figures provided herewith are not necessarily to scale. They are provided for purposes of illustration to ease in the understanding of the presently-disclosed invention.

DETAILED DESCRIPTION

The present disclosure provides innovative electromagnetic surveying techniques which use a source signal that adapts or changes during the survey. The adaptations made to the source signal may depend on a receiver signal, which is obtained by using one or more electromagnetic sensors, and/or an auxiliary signal, which is obtained by using one or more auxiliary sensors.

Figure 1:
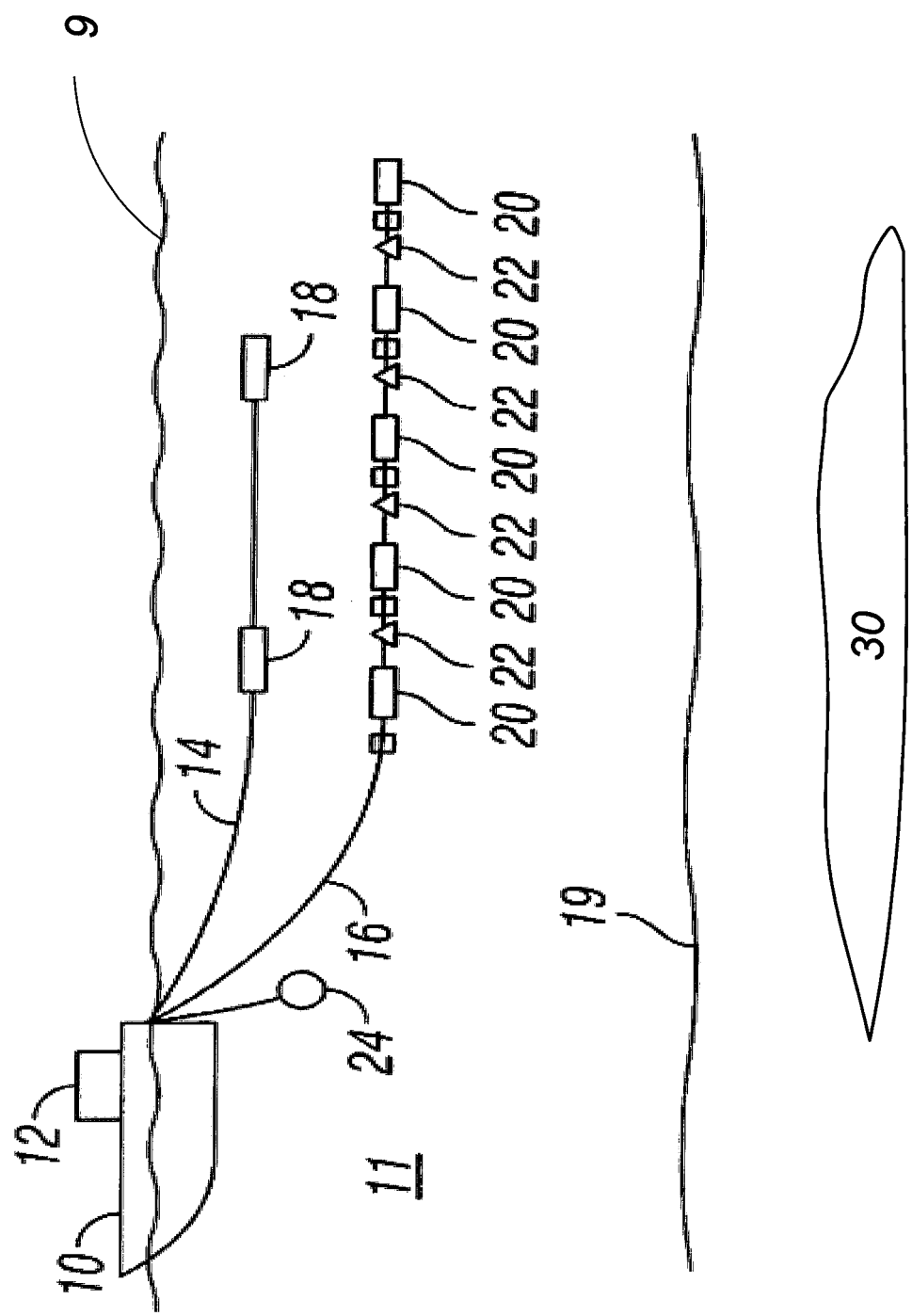
FIG. 1 depicts marine surveying apparatus which may be used for adaptive source electromagnetic surveying in accordance with an embodiment of the invention.

FIG. 1 depicts marine surveying apparatus which may be used for adaptive source electromagnetic surveying in accordance with an embodiment of the invention. As shown, a survey vessel 10 may move along the surface 9 of a body of water 11, such as a sea, river, lake, or ocean. The vessel 10 may include equipment which may be referred to as a recording system 12. The recording system 12 may include devices for applying electric current to an antenna or antennas, such as source electrodes 18 and/or other devices disposed on or along a source cable 14 towed by the vessel 10. The recording system 12 may also include navigation equipment for navigating the vessel 10, positioning equipment for determining the geodetic position of the vessel 10 and of components towed by the vessel 10 in the water 11, and a signal recording device for recording data such as signals detected by one or more sensors on a sensor cable 16. As shown, the sensor cable 16 may also be towed by the vessel 10. Alternatively, sensor cable 16 may be towed by another vessel (not shown), or the sensors may be configured on ocean bottom cables.

The source cable 14 in the present example may include an antenna consisting of multiple (two are shown in the illustrated example) source electrodes 18 disposed at spaced apart positions along the source cable 14. At selected times, certain components of the equipment in the recording system 12 may conduct electric current across the source electrodes 18. The time varying component of such electric current produces an electromagnetic field that propagates through the water 11 and into the subsurface formations below the water bottom 19. The subsurface formations below the water bottom 19 may include, for example, a resistive anomaly region 30 whose characteristics may be the target of the surveying.

The arrangement of the source electrodes 18 shown in FIG. 1, referred to as an in-line horizontal electric dipole antenna, is not the only type of electromagnetic transmitter antenna that may be used with the invention. The source cable 14 may also include, in addition to, or in substitution of, the in-line horizontal electric dipole transmitter antenna shown in the figure, any one or more of a cross-line electric dipole antenna, a vertical electric dipole antenna, and horizontal or vertical magnetic dipole antenna (current loop), or similar devices with other orientations with respect to the towing direction.

In the illustrated example, the vessel 10 may also tow at least one sensor cable 16. The sensor cable 16 may include a plurality of electromagnetic sensors 20 at spaced apart positions along the sensor cable 16. Each of the electromagnetic sensors 20 may measure a parameter related to the electromagnetic field resulting from interaction of the electromagnetic field imparted by the transmitter (e.g., source electrodes 18) into the subsurface formations below the water bottom 19. In the present example, the electromagnetic sensors may be a pair of receiver electrodes disposed at spaced apart positions along the sensor cable 16. An electric field component of the electromagnetic field resulting from interaction of the imparted electromagnetic field with the formations below the water bottom 19 may induce voltages across each of the pairs of receiver electrodes, and such voltages may be detected by a voltage measuring circuit. Such voltage measuring circuits may be disposed in the sensor cable 16 and/or in the recording system 12. Another example of an electromagnetic sensor that may be used is a single axis or multi-axis magnetometer, such as a flux gate magnetometer.

The sensor cable 16 in some examples may also include seismic sensors, such as hydrophones and/or geophones, shown generally at 22, disposed at spaced apart locations along the sensor cable 16. For such examples where the sensor cable 16 includes seismic sensors, the survey vessel 10 or another vessel may tow a seismic energy source 24, such as an air gun or array of air guns. The seismic energy source 24 may be actuated at selected times by certain equipment in the recording system 12 and signals detected by the seismic sensors 22 may be recorded by a signal recording device in the recording system 12. During survey operations, seismic signals may be acquired substantially contemporaneously with electromagnetic signals detected by the electromagnetic sensor 20 or may be acquired at other times.

It should be understood that the example system in the figure including only one sensor cable 16 is shown to illustrate how to make and use a sensor cable according to various aspects of the invention. Such a sensor cable may be used in acquisition systems that include a plurality of laterally spaced apart sensors cables towed by the survey vessel 10, and/or by another vessel, in a selected configuration to provide "in line" and "cross line" electromagnetic and/or seismic signals. Additional aspects of marine surveying apparatus for adaptive source electromagnetic surveying are discussed in more detail below.

Figure 2:
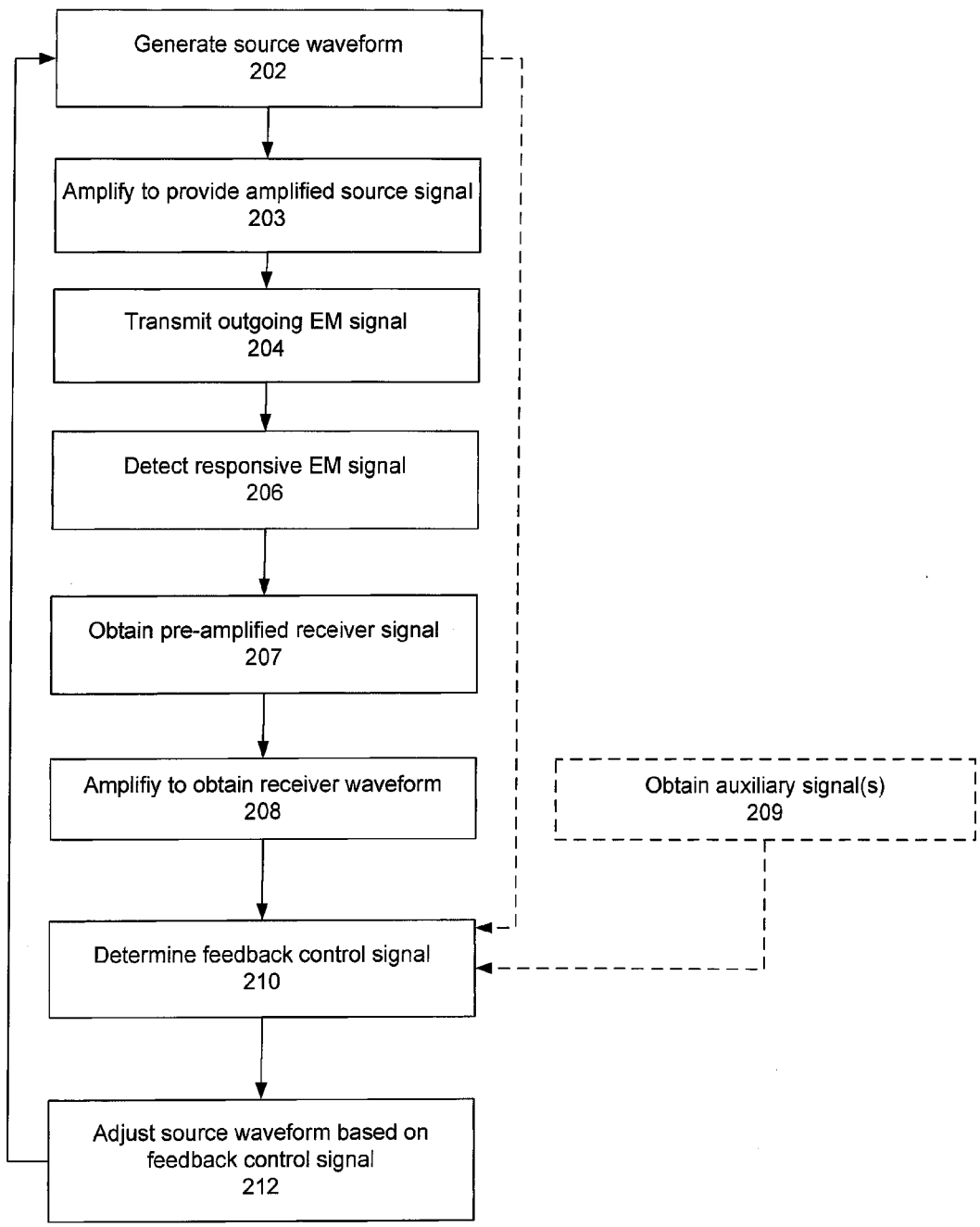
FIG. 2 is a flow chart showing a method for adaptive source electromagnetic surveying in accordance with an embodiment of the invention.

FIG. 2 is a flow chart showing a method 200 for adaptive source electromagnetic surveying in accordance with an embodiment of the invention. The method 200 may be performed using apparatus that is on, or is towed by, a vessel traveling across a body of water. A target of the electromagnetic surveying may be a resistive anomaly region or other subsurface formation.

Per step 202, a source waveform signal is generated. The source waveform generation may be accomplished using an adjustable source generator. The source waveform signal may be, for example, a broadband signal that includes one or more pronounced frequency peaks.

Per block 203, the source waveform signal may be amplified, if necessary, using a transmitter amplifier circuit to provide an amplified source signal. Per step 204, an outgoing electromagnetic (EM) signal may be transmitted. The transmission may be accomplished using an antenna that is driven by the amplified source signal. The outgoing EM signal may be transmitted underwater and below the bottom of the body of water such that it interacts with a target subsurface structure.

Per step 206, a responsive EM signal may be received by one or more electromagnetic sensors. The responsive EM signal depends upon, and provides information regarding, the structural and material characteristics of the body of water and the subsurface structure. Per step 207, a pre-amplified receiver signal may be obtained from the sensors. Per step 208, the pre-amplified receiver signal may be amplified using a receiver amplifier circuit to provide a receiver waveform signal. This amplification step 208 is optional and may not be necessary if the pre-amplifier has sufficiently high gain.

Per step 210, a feedback control signal may be determined using a feedback generator circuit. The feedback control signal may depend on at least the receiver waveform signal which may be received by the feedback generator from the receiver amplifier circuit. The feedback control signal may also depend on the source waveform signal which may be received from the source generator. In certain embodiments of the invention, the feedback control signal may further depend on one or more auxiliary signals obtained from one or more auxiliary systems per step 209. For example, the auxiliary signals may be obtained from geophone and/or hydrophone sensors which may be towed by the same vessel. As further examples, the auxiliary signals may be obtained from other sensors, such as accelerometers and magnetometers in the EM streamer measuring its movement. Additionally, in embodiments with multiple sources, the feedback control signal for one source may depend on auxiliary signals obtained from the source generator associated with another source.

Per step 212, the source waveform signal may be adjusted based on the feedback control signal. The adjustable source generator may be configured to receive the feedback control signal and to utilize it so as to make an appropriate adjustment to the source waveform signal. For example, a frequency peak in the source waveform signal may be shifted in response to a feedback control signal indicating a frequency shift in the receiver waveform signal, or the Earth's frequency response which is the deconvolution of the receiver waveform signal with the source waveform signal.

Thereafter, as shown in the figure, the method 200 may loop back to step 202 to repeat performance of the above-discussed steps (i.e. steps 202, 203, 204, 206, 207, 208, 209, 210, and 212). In this way, the EM surveying may be performed using a source which is adaptive to changes in the receiver waveform signal, the Earth's frequency response (and also to changes in auxiliary signals in some embodiments). In one embodiment, the steps may be repeated throughout a survey of a target region so that the source waveform is continuously adapted using the feedback control loop. In another embodiment, the steps 210 and 212 may be applied periodically so that the source waveform is periodically adapted using the feedback control loop.

Figure 3:
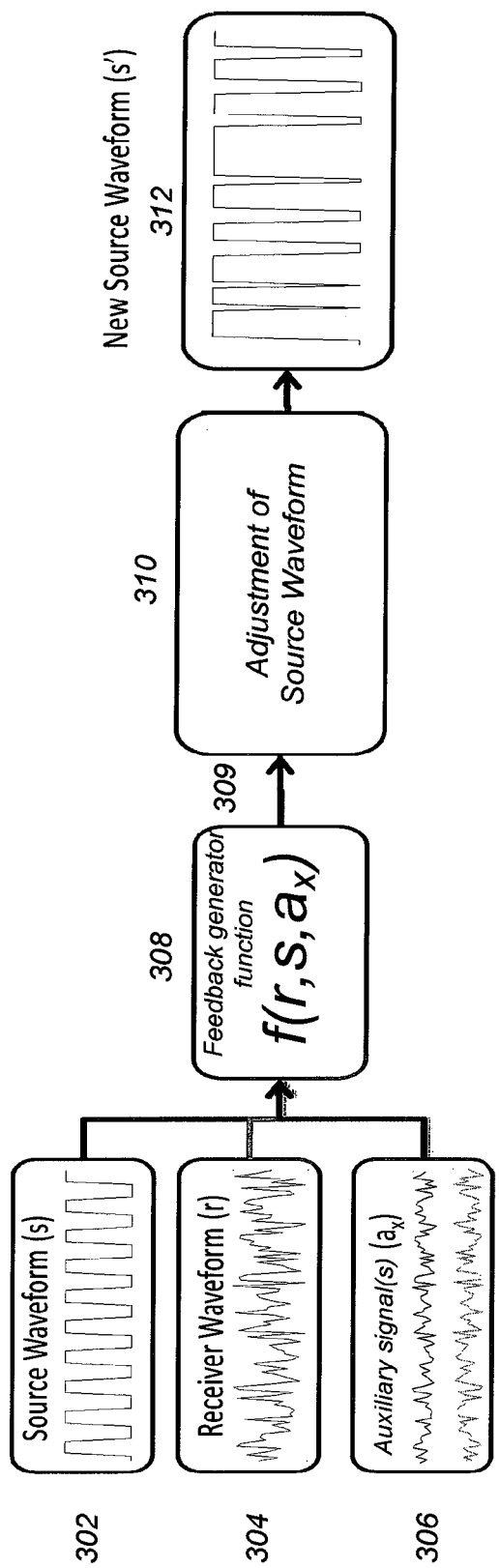
FIG. 3 depicts input signals which may be used to adapt a source waveform in accordance with an embodiment of the invention.

FIG. 3 depicts input signals which may be used to adapt a source waveform in accordance with an embodiment of the invention. As depicted in FIG. 3, the input signals may include the source waveform (s) 302, the receiver waveform (r) 304, and one or more auxiliary signals ($a_x$) 306. A feedback function $f(r, s, a_x)$ 308 may generate a feedback control signal 309 based on the input signals. Adjustment or adaptation of the source waveform 310 may then be performed based on the feedback control signal 309. This results in the new or adapted source waveform (s') 312.

While FIG. 3 shows three kinds of input signals being used (source waveform, receiver waveform, and auxiliary signals), not all three kinds need to be used to generate the feedback control signal. In other words, the feedback function need not depend on all three types of signals.

For example, in one embodiment, the feedback function $f(r,s)$ may generate the feedback control signal using the source waveform (s) 302 and the receiver waveform (r) 304, without using an auxiliary signal ($a_x$) 306. In another embodiment, the feedback function $f(r)$ may generate the feedback control signal using just the receiver waveform signal (r) 306. In another embodiment, the feedback function $f(s,a_x)$ may generate the feedback control signal using the source waveform (s) 302 and one or more auxiliary signals ($a_x$) 306, without using the receiver waveform (r) 304. In another embodiment, the feedback function $f(a_x)$ may generate the feedback control signal using one or more auxiliary signals ($a_x$) 306. In another embodiment, the feedback function $f(r,a_x)$ may generate the feedback control signal using the receiver waveform (r) 304 and one or more auxiliary signals ($a_x$) 306, without using the source waveform (s) 302.

In accordance with an embodiment of the invention, the source waveform may be adapted in real-time as a shot or survey line is being recorded. In effect, the source-sensor-receiver chain forms a real-time feedback loop which may act as a control system. Advantageously, the feedback loop enables the definition and use of specific optimization rules that may lead to more valuable received signals (i.e. received signals that contain more useful information).

Alternatively, in accordance with another embodiment of the invention, the source waveform may be adapted on a longer time scale, such as, for example, between shots during a line. An example of such an embodiment is now described in relation to FIGS. 4 through 7B.

Figure 4:
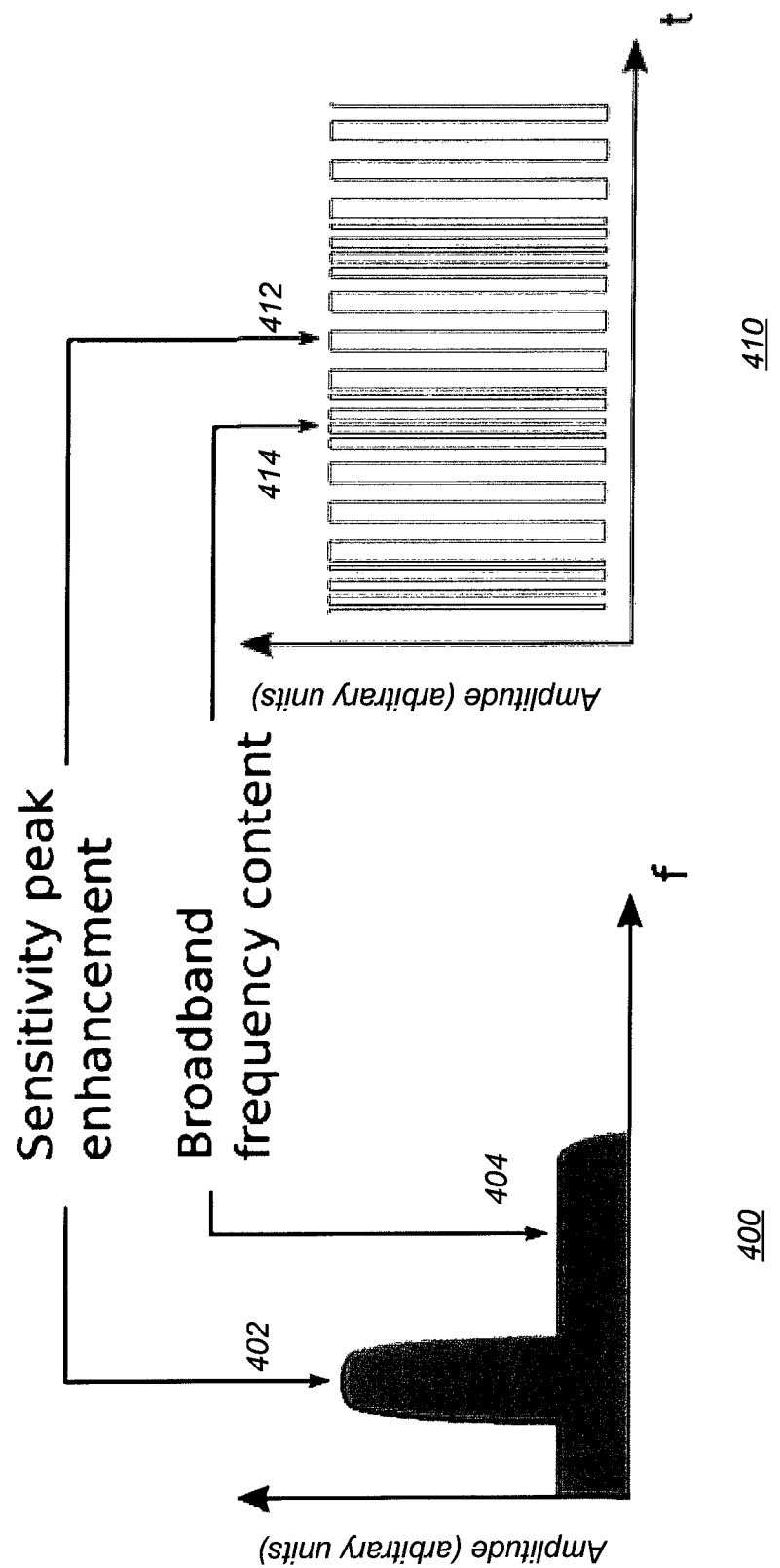
FIG. 4 depicts a broadband source waveform signal in frequency and time domains in accordance with an embodiment of the invention.

FIG. 4 depicts a broadband source waveform signal in frequency 400 and time 410 domains in accordance with an embodiment of the invention. As shown in the frequency domain graph 400, the source waveform signal may include a sensitivity peak enhancement 402 to the broadband frequency content 404. The sensitivity peak enhancement contribution 412 and the broadband frequency content contribution 414 are also apparent in the time domain graph 410.

FIGS. 5A and 5B depict frequency-domain graphs of an example Earth's frequency response signal 502 and a corresponding source waveform signal 504, respectively, in accordance with an embodiment of the invention. The Earth's frequency response signal may be obtained by deconvolving the receiver waveform signal with the source waveform signal. Hence, the Earth's frequency response signal requires both the receiver and source waveform signals.

As shown in FIG. 5A, the Earth's frequency response may include a local amplitude minimum at frequency $f_0$. As shown in FIG. 5B, the source waveform signal may comprise a broadband signal with an amplitude peak (maximum) at frequency $f_p$. In one implementation, a frequency shift of the Earth's frequency response may be determined by obtaining a frequency shift in the relative minimum frequency $f_0$, and a frequency shift in the source waveform signal may result in a frequency shift in the peak frequency $f_p$.

FIGS. 6A and 6B depict, respectively, a positive frequency shift in the Earth's frequency response and a corresponding positive shift in an adaptive source signal in accordance with an embodiment of the invention. As depicted in FIG. 6A, the relative minimum frequency $f_0$ may experience a positive frequency shift from a prior signal 602 to a current signal 603. In accordance with an embodiment of the invention, the source waveform signal may change or adapt in response to the positive frequency shift in the Earth's frequency response. As shown in FIG. 6B, the source waveform signal may be adjusted (based on a feedback control signal) so that the peak frequency $f_p$ experiences a corresponding positive frequency shift from a prior signal 604 to a current signal 605.

FIGS. 7A and 7B depict, respectively, a negative frequency shift in the Earth's frequency response and a corresponding negative shift in an adaptive source signal in accordance with an embodiment of the invention. As depicted in FIG. 7A, the relative minimum frequency $f_0$ may experience a negative frequency shift from a prior signal 702 to a current signal 703. In accordance with an embodiment of the invention, the source waveform signal may change or adapt in response to the negative frequency shift in the Earth's frequency response. As shown in FIG. 7B, the source waveform signal may be adjusted (based on a feedback control signal) so that the peak frequency $f_p$ experiences a corresponding negative frequency shift from a prior signal 704 to a current signal 705. Note that while the figures described above show a continuous broad peak in the source waveform signals, an actual source waveform signal may include a collection of discrete peaks whose amplitude and frequency position may be optimized. For example, the source waveform signal may include several (for example, ten) discrete peaks (instead of the continuous broad peaks per FIGS. 5B, 6B and 7B) that should map out the "bump" in the frequency response curve (per FIGS. 5A, 6A and 7A). The several discrete peaks of the source waveform signal may be adjusted in terms of both amplitude and frequency so as to adapt to changes in the receiver waveform signal.

The above-described frequency shifting of the source signal in an adaptive response to frequency shifting in Earth's frequency response may be implemented, for example, on a shot-by-shot basis. In such an embodiment, the amplitude minimum position of the Earth's frequency response of a previous shot may be used as feedback to adjust the peak frequency of the source signal for a current shot. Advantageously, the effective signal-to-noise ratio (SNR) of the received signal may be improved with this technique.

In other embodiments, instead of the Earth's frequency response, other signals may be used to provide feedback to adjust the source signal. For example, a peak frequency in the frequency spectrum of the receiver signal may be used as feedback to adjust the peak frequency of the source signal for a current shot.

In other embodiments, the adaptation of the source signal may depend on feedback for multiple previous shots. For example, the Earth's frequency response or the receiver signal for several previous shots in sequence may be processed and used as feedback to adjust the peak frequency of the source signal for a current shot.

In another embodiment, the adaptation of the source signal may depend on feedback generated from multiple signals. For example, the receiver waveform signal and one or more auxiliary signals may be processed to provide feedback to adjust the source signal.

The auxiliary signals may be obtained from various devices. For example, accelerometers may provide signals which may be utilized to counter effects of changing weather during a survey. If the accelerometer signals indicate large movements indicative of a storm, then the source may be adapted to generate higher amplitude and narrower frequency source signals so as to improve a signal-to-noise ratio. On the other hand, if the accelerometer signals indicate only small movements indicative of calmer weather, then the source may be adapted to generate a more broadband source signal to achieve better frequency coverage.

Figure 8:
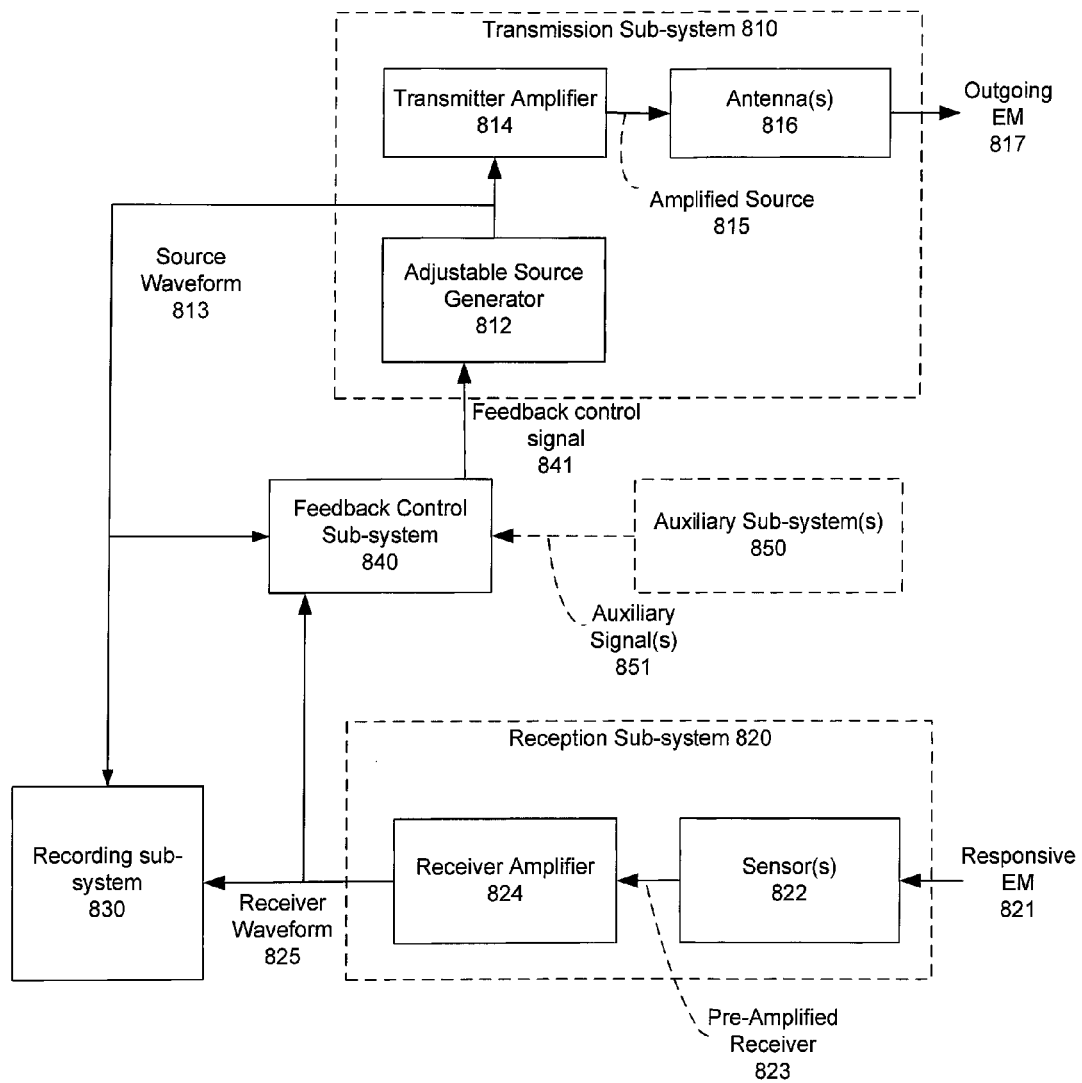
FIG. 8 is a block diagram depicting select components of a system for adaptive source electromagnetic surveying in accordance with an embodiment of the invention.

FIG. 8 is a block diagram depicting a system 800 for adaptive source electromagnetic surveying in accordance with an embodiment of the invention. As shown, the system 800 may include a transmission subsystem (e.g., transmitter) 810, a reception subsystem (e.g., receiver) 820, a recording subsystem (e.g., recorder) 830, a feedback control subsystem (e.g., feedback controller) 840, and one or more auxiliary subsystems 850. The various components of the system 800 may be on, or towed by, a vessel traveling over a target subsurface structure under a body of water.

The transmission subsystem 810 may include an adjustable source generator 812, a transmitter amplifier 814, and an antenna 816 (for example, the source electrodes 18 in FIG. 1). The adjustable source generator 812 may be a circuit arranged to generate a source waveform signal 813. The source waveform signal 813 may be, for example, a broadband signal that includes one or more frequency peaks. The transmitter amplifier 814 may be a circuit arranged to amplify the source waveform signal 813 to provide an amplified source signal 815. The antenna 816 may be arranged to be driven by the amplified source signal 815 so as to transmit an outgoing electromagnetic (EM) signal 817. The outgoing EM signal may be transmitted underwater and below the bottom of the body of water such that it interacts with a target subsurface structure.

The reception subsystem 820 may include one or more EM sensors 822 (for example, the electromagnetic sensors 20 in FIG. 1) and a receiver amplifier 824. A responsive EM signal 821 may be detected by one or more electromagnetic sensors 822. The responsive EM signal 821 depends upon, and provides information regarding, the structural and material characteristics of the body of water and the subsurface structure. A pre-amplified receiver signal 823 may be output by the sensor(s) 822 and may be amplified using the receiver amplifier circuit 824 to provide a receiver waveform signal 825. The receiver waveform signal 825 may be output to the recording subsystem 830 and the feedback control subsystem 840.

The recorder subsystem 830 may be arranged to record the receiver waveform signal 825 from the receiver system 820. In accordance with an embodiment of the invention, the recorder subsystem 830 may be further arranged to also record the source waveform signal 813 which adaptively changes over time during the survey. The recorder subsystem 830, or a separate data processing system, may be configured to process at least the receiver waveform signal 825 so as to extract useful information about the sub-bottom structure under the region being surveyed.

The feedback control subsystem 840 may be a circuit arranged to receive at least the receiver waveform signal 825 and generate a feedback control signal 841. The feedback control signal 841 may depend on at least the receiver waveform signal 825 which may be received by the feedback control subsystem 840 from the receiver amplifier 824. The feedback control signal may also depend on the source waveform signal 813 which may be received from the source generator. In certain embodiments of the invention, the feedback control signal 841 may further depend on one or more auxiliary signals 851 obtained from one or more auxiliary systems 850. For example, auxiliary signals 851 may be obtained from geophone and/or hydrophone sensors which may be towed by the same vessel. As further examples, the auxiliary signals 851 may be obtained from other sensors, such as accelerometers and magnetometers in the EM streamer measuring its movement. Additionally, in embodiments with multiple sources, the feedback control signal for one source may depend on auxiliary signals obtained from the source generator associated with another source.

The adjustable source generator 812 in the transmission subsystem 810 may be configured to receive the feedback control signal 841 and to utilize it so as to make an appropriate adjustment to the source waveform signal 813 being generated. For example, a frequency peak in the source waveform signal 813 may be shifted in response to a feedback control signal 841 indicating a frequency shift in the receiver waveform signal 825.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for electromagnetic surveying of a subsurface formation under a region being surveyed, the method comprising:
generating a source waveform signal using an adjustable source generator;
amplifying the source waveform signal using a transmitter amplifier circuit to obtain an amplified source signal;
transmitting an outgoing electromagnetic signal by an antenna which is driven by the amplified source signal;
detecting, using a plurality of electromagnetic sensors, a responsive electromagnetic signal;
amplifying the responsive electromagnetic signal using a receiver amplifier circuit to obtain a receiver waveform signal;
recording and processing the receiver waveform signal by a recording sub-system to extract information about the subsurface formation under the region being surveyed;
receiving the receiver waveform signal from the receiver amplifier circuit by a feedback control sub-system;
outputting a feedback control signal indicating a measured frequency shift in the receiver waveform signal from the feedback control sub-system to the adjustable source generator; and
adapting the source waveform signal by the adjustable source generator using the feedback control signal.

2. The method of claim 1, wherein the feedback generator circuit further receives an auxiliary signal.

3. The method of claim 1, wherein the receiver amplifier operates by
obtaining a pre-amplified receiver signal from the at least one electromagnetic sensor; and
amplifying the pre-amplified receiver signal to obtain the receiver waveform signal.

4. The method of claim 1, further comprising:
repeating the generating the source waveform, amplifying the source waveform, transmitting an outgoing electromagnetic signal, detecting the responsive electromagnetic signal, amplifying the source waveform signal, recording and processing the receiver waveform signal, receiving the receiver waveform signal, outputting the feedback control signal, and adapting the source waveform steps during an electromagnetic survey of the subsurface formation.

5. The method of claim 1, wherein the subsurface formation is under a body of water, and wherein the antenna and the at least one electromagnetic sensor are towed underwater by a vessel during the electromagnetic survey of the subsurface formation.

6. The method of claim 5, wherein the feedback control sub-system and the adjustable source generator are on, or attached to, the vessel.

7. The method of claim 1, wherein the source waveform signal comprises at least one frequency peak which is shifted based on the feedback control signal.

8. An apparatus configured for electromagnetic surveying of a subsurface formation under a region being surveyed, the apparatus comprising:
an adjustable source generator that generates a source waveform signal;
a transmitter amplifier circuit for amplifying the source waveform signal and outputting an amplified source signal;
a transmitter configured to transmit an outgoing electromagnetic signal using an antenna which is driven by the amplified source signal;
a plurality of electromagnetic sensors configured to detect a responsive electromagnetic signal;
a receiver amplifier circuit that amplifies the responsive electromagnetic signal to generate a receiver waveform signal;
a recording system for recording the receiver waveform signal for subsequent processing by a data processing system to extract information about the subsurface formation under the region being surveyed; and
a feedback controller configured to receive the receiver waveform signal from the receiver amplifier circuit and output a feedback control signal indicating a measured frequency shift in the receiver waveform signal to the adjustable source generator,
wherein the adjustable source generator adapts the source waveform signal using the feedback control signal from the feedback control subsystem.

9. The apparatus of claim 8, further comprising:
an auxiliary sub-system that obtains an auxiliary signal and outputs the auxiliary signal to the feedback controller for use in generating the feedback control signal.

10. The apparatus of claim 9, wherein the auxiliary sub-system comprises a sub-system from a group of sub-systems consisting of geophone sensors, hydrophone sensors, accelerometers, magnetometers, and signals obtained from a source generator associated with another source.

11. The apparatus of claim 8, wherein the antenna and the plurality of electromagnetic sensors are configured to be towed underwater by a vessel during the electromagnetic surveying.

12. The apparatus of claim 8, wherein the feedback controller is on, or attached to, the vessel.

13. A method for adapting a source waveform signal for geophysical surveying comprising:
generating the source waveform signal;
transmitting an outgoing signal which is based on the source waveform signal;
detecting a responsive signal using a plurality of sensors, wherein the responsive signal results from interaction between the outgoing signal and a subsurface formation;
obtaining a receiver waveform signal which is based on the responsive signal;
obtaining at least one input signal comprising the receiver waveform signal;
determining a feedback control signal which indicates a measured frequency shift in the receiver waveform signal; and
adapting the source waveform signal based on the feedback control signal.

* * * * *